United States Patent
Luo et al.

(10) Patent No.: US 12,452,080 B2
(45) Date of Patent: Oct. 21, 2025

(54) SIGNATURE GRAPH METHOD FOR ENABLING HUMAN AUTHENTICATION OF HIGH-ENTROPY DATA

(71) Applicant: Cypress Semiconductor Corporation, San Jose, CA (US)

(72) Inventors: Hui Luo, Marlboro, NJ (US); Hans Van Antwerpen, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 468 days.

(21) Appl. No.: 17/878,706

(22) Filed: Aug. 1, 2022

(65) Prior Publication Data
US 2024/0039732 A1   Feb. 1, 2024

(51) Int. Cl.
*H04L 9/32* (2006.01)
*H04L 9/00* (2022.01)

(52) U.S. Cl.
CPC .......... *H04L 9/3247* (2013.01); *H04L 9/3239* (2013.01); *H04L 9/50* (2022.05)

(58) Field of Classification Search
CPC ....... H04L 9/3247; H04L 9/3239; H04L 9/50; H04L 2209/80; G09C 5/00
See application file for complete search history.

(56) References Cited

U.S. PATENT DOCUMENTS

| | | | | |
|---|---|---|---|---|
| 8,756,672 | B1* | 6/2014 | Allen | G06F 21/36 |
| | | | | 726/19 |
| 11,062,106 | B2* | 7/2021 | Ebrahimi | G06K 7/1417 |
| 2015/0143107 | A1* | 5/2015 | Kale | H04L 63/065 |
| | | | | 713/171 |
| 2015/0350119 | A1* | 12/2015 | Thirumalai | H04L 67/55 |
| | | | | 713/150 |
| 2016/0182624 | A1* | 6/2016 | Liang | H04L 12/12 |
| | | | | 709/228 |
| 2016/0307113 | A1* | 10/2016 | Calapodescu | G06F 16/35 |
| 2017/0352129 | A1* | 12/2017 | Fu | B60K 35/00 |
| 2022/0247729 | A1* | 8/2022 | Hsu | H04L 9/0827 |

* cited by examiner

*Primary Examiner* — Ali S Abyaneh

(57) ABSTRACT

A signature graph method is proposed to authenticate shared high-entropy data using a graph that can be easily identified by human eyes (or by computer image recognition algorithms). An example method for authenticating a shared data element comprises receiving a data element to be shared; transforming the data element to be shared into signature graph data, using at least one collision-resistant one-way mapping function; and rendering a human-perceptible representation of the signature graph data, such as an audible and/or visual representation, for perception by a human user. In some embodiments, transforming the data element comprises applying a cryptographic hash function to the data element, to obtain a first hash output, and applying a cryptographic hash function to the first hash output, to obtain the signature graph data.

20 Claims, 8 Drawing Sheets

SIGNATURE GRAPH METHOD FOR ENABLING HUMAN AUTHENTICATION OF HIGH-ENTROPY DATA

TECHNICAL FIELD

The present application is generally related to data security and is more particularly related to techniques for cryptographically authenticating shared data.

BACKGROUND

Humans have difficulty memorizing high-entropy data, i.e., data comprising a high degree of apparent randomness. At the same time, people are faced with increasing needs to protect data with passwords. This creates data security problems, such as the widespread use of dictionary attacks against passwords. These attacks can be successful when the passwords have low entropy, which is common since humans have difficulty remembering the passwords otherwise. More complex data security problems include man-in-the-middle attacks against public key-based key exchange/establishment algorithms, because high-entropy public keys for a person's communication counterpart cannot be easily remembered.

Current techniques to mitigate against such man-in-the-middle attacks include the following approaches: (1) having at least one communication party's public key signed, and thus authenticated, in a security certificate issued by a certificate authority (CA) whose public key is known as a prior to everyone; (2) pre-delivering at least one communication party's public key to the other party in a reliable, out of band method (cannot be delivered in band before the communication counterparty is authenticated and the communication channel is encrypted); (3) and pre-arranging a shared secret such as a password between two parties and run key exchange algorithms using the shared secret. A drawback for the first approach is the expense incurred in establishing and maintaining the CA and the provisioning of the security certificate. A drawback for the second and third approaches is that such pre-arrangements may be difficult or even impossible in many applications.

Accordingly, improved techniques for easily and inexpensively facilitating the authentication of shared high-entropy data elements, such as passwords, is needed.

SUMMARY

Embodiments of the techniques described herein employ a signature graph to authenticate a piece of high-entropy shared data, using a graph that can be easily recognized from its appearance by a human or, in some embodiments, by computer image-recognition algorithms. The graph may be generated from a mini block chain derived from the data, where the mini block chain consists of at least two blocks: a first block comprising a hash of the shared data, and a second block comprising a hash of the first block.

The signature graph is generated in a manner that provides for visual distinctiveness. In an example embodiment, the signature graph is generated by "walking" a dot, which appears in one of four colors, to one of eight directions, in a distance that varies between one- and eight-unit lengths, where the color, direction, and distance depends on each 8-bit value in a bit stream corresponding to the mini block chain. More generally, various animations, videos, or audio presentations may be used for the signature graph.

Embodiments detailed below include an example method, in a computing device, for authenticating a shared data element, where the method comprises receiving a data element to be shared and transforming the data element to be shared into signature graph data, using at least one collision-resistant one-way mapping function. The method further comprises rendering a human-perceptible representation of the signature graph data, such as an audible and/or visual representation, for perception by a user of the computing device. The method may further comprise receiving, from the user of the computing device, an indication of acceptance of the shared data element and, responsive to receiving this indication of acceptance, using the data element as a public key for authenticating and/or encrypting communications with a second device.

Other embodiments include a corresponding method for distributing a shared data element, where this example method comprises providing the shared data element to a receiving device and displaying or performing a visual and/or audio representation of signature graph data, for perception by a user of the receiving device, where the data element to be shared has been transformed into the signature graph data, using at least one collision-resistant one-way mapping function.

Further examples are described below, as are corresponding apparatuses and various example details for generating the signature graph data and the visual and/or audio representations of the signature graph data. In various embodiments and applications, the characteristics of the hash function and block chain ensure that it is computationally impossible to generate a similar signature graph from a different piece of data. This means the signature graph can be used to authenticate a piece of difficult-to-memorize, high-entropy data, such as a public key, without using a CA to endorse the public key. Several examples are given to show how the signature graph method can be used as a generic method in a variety of cryptography applications, such as secure hotspot Wi-Fi access, secure casual Wi-Fi Direct/Aware connection, secure pairing/provisioning with IoT devices with no display and keypad, secure large-scale public Wi-Fi network access, etc.

DETAILED DESCRIPTION

Figure 1B:
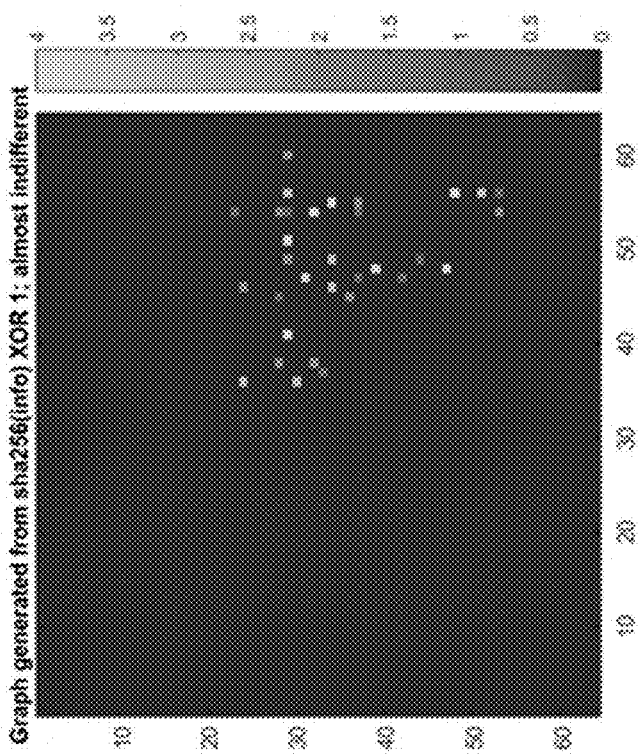
FIGS. 1A and 1B illustrate first and second signature graphs generated from only a first hash block.

Applications for the techniques described herein include improving security for the use of hotspot Wi-Fi and public Wi-Fi networks. Currently, open access (no authentication) is often used, or published password-based WPA2-PSK (Wi-Fi Protected Access 2-Pre-Shared Key) may be used to provide some degree of security. However, these two methods do not provide any link-layer security at all. A user's over-the-air traffic can be read by anyone nearby and can suffer from a man-in-the-middle attack, where an attacker masquerades as a legitimate service provider to establish a connection with an unsuspecting user and then eavesdrops on the communications it relays to and from the user. Published password-based WPA3 SAE (Wi-Fi Protected Access 3 Simultaneous Authentication of Equals) and OWE (Opportunistic Wireless Encryption) can encrypt unicast data traffic for each user, using user-specific keys, but a user may still be vulnerable to a man-in-the-middle attack because of a lack of reliable authentication. Although a public Wi-Fi access point (AP) can use a security certificate to authenticate the AP itself, it is very rare to see such APs due to the high cost of configuring and maintaining the security certificate.

The techniques described herein are also applicable to peer-to-peer scenarios, such as those supported by the Wi-Fi Direct and Wi-Fi Aware connectivity technologies. Securing casual Wi-Fi Direct connections is commonly done using WPS PIN (Wi-Fi Protected Setup Personal Identification Number). Securing casual Wi-Fi Aware connections may be done using WPA2-PSK, without specifying how the PSK is delivered among Wi-Fi terminals (STAs) that will join a certain service. Proprietary peer-to-peer technologies based on Wi-Fi Direct and Wi-Fi Aware may use certificates signed by a product vendor's private key for mutual authentication between two devices from the same vendor.

However, Wi-Fi Direct/Aware technology has difficulty ensuring security for causal connections at the link layer. Wi-Fi Direct proposed a WPS-PIN method for authenticating two pairing Wi-Fi devices, but the PIN has only eight digits. This issue was caused by the problem of human memory. As a result, the weak PIN leads to weak security performance of WPS-PIN method. WPS-PIN was later totally compromised. Per the lesson from Wi-Fi Direct, the Wi-Fi Aware specifications simply leave security problems to application-level protocols.

Authentication in other peer-to-peer scenarios may be based on user certificates signed by the product vendor's private key when the user's account or identifier is created. This approach leaves encryption to application-level protocols. The certificate-based authentication can be strong, but relies on certificates signed by product vendors, so the protocol is limited between devices from that vendor or affiliated vendors.

The techniques described herein address these problems by employing a signature graph method that facilitates authentication of a piece of high-entropy data using a graph that can be easily recognized and identified by human eyes, or by computer image recognition algorithms. In some embodiments, the graph is generated from a mini blockchain derived from the data. The mini blockchain consists of at least two blocks, where a first block is a hash value of the data (SHA256 or above can be used), while the second block is the hash value of the first block. If needed, per the security performance requirements of a specific application, more blocks can be added in the block chain, with each block being the hash value of the preceding block.

Many algorithms can be used to generate the signature graph from the mini block chain. One approach is to walk a dot that is displayed in one of 4 colors (2 bits) to one of 8 directions (3 bits) in a distance between 1 and 8 (3 bits), based on every 8-bit value in the bit stream of the mini block chain. More generally, an animation, a video, a meaningful piece of audio, or any presentation form for human perception, can be generated as a signature.

The characteristics of the hash function and blockchain assure it is computationally impossible to generate a similar signature graph from a different piece of data. The hash function is a collision-resistant, one-way mapping function that ensures that even if two examples of input data only differ by one bit, the hash result will have a significant number of bit differences. Thus, if a different piece of input data is tuned to generate a hash result that has many bits identical to the hash result of the legitimate input data, this tuned input data might generate a similar first half of the signature graph (the dot walk pattern from the first hash block). However, the second hash block derived from the first hash block will surely have many bit differences, so that the second half of the signature graph (the dot walk pattern from the second hash block) cannot be made "similar" to the legitimate signature graph. This ensures that the entire signature graphs are very different for different input data.

Figure 1A:
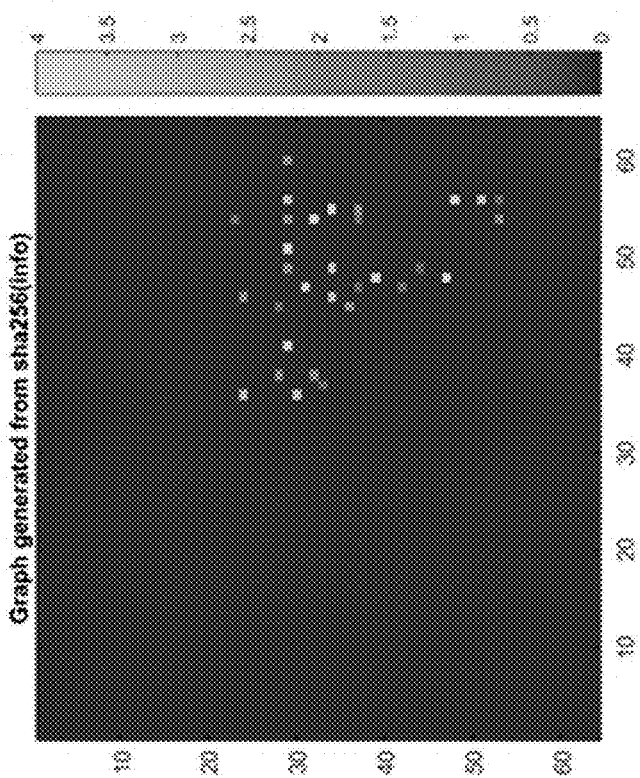
Figures 2A, 2B:
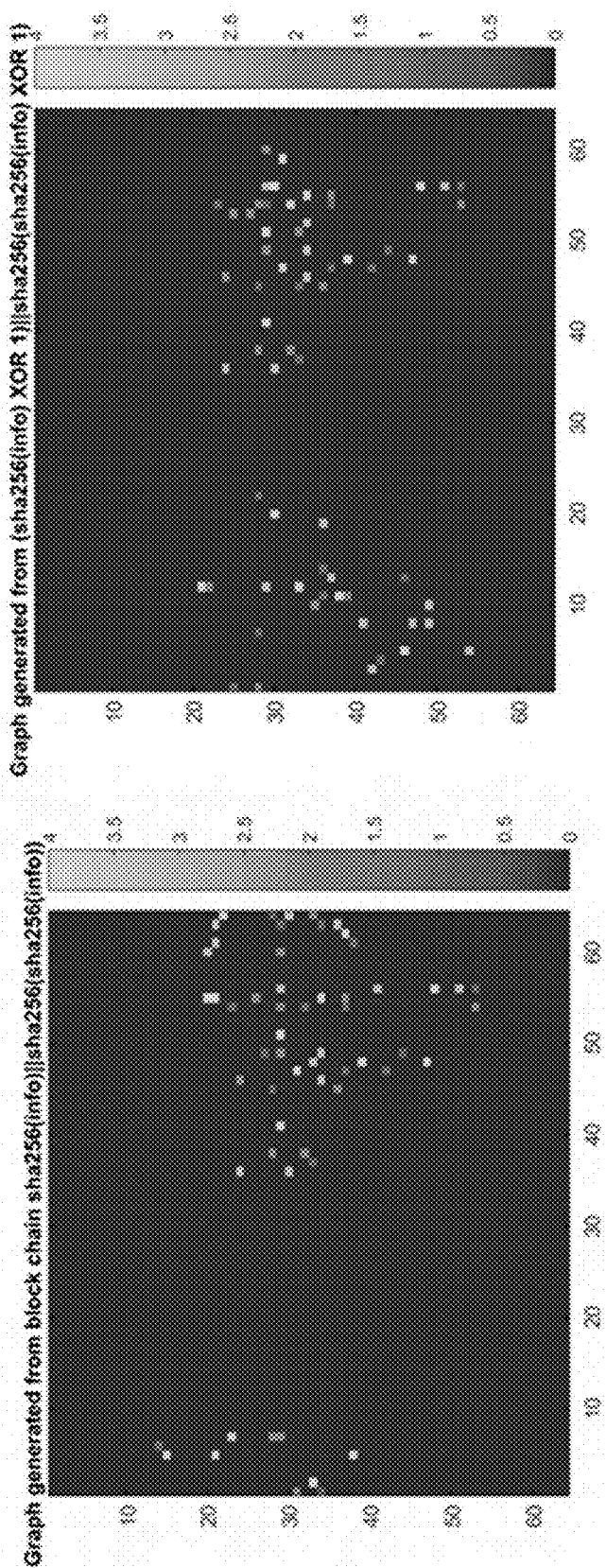
FIGS. 2A and 2B show example signature graphs generated from a second hash block generated as a hash of a first block.

This is shown in FIGS. 1A and 13 and FIGS. 2A and 2B. FIGS. 1A and 13 illustrate example signature graphs generated from only a first hash block, which may be a hash value generated from the password or other data element to be authenticated. FIG. 1A shows the signature graph generated from a first hash block, which in turn was generated from the data element to be authenticated. FIG. 13 shows a corresponding signature graph generated from a hash block that differs from the first hash block in only one bit. The difference between the signature graphs is very difficult to identify. FIGS. 2A and 2B, however, illustrate example signature graphs generated from a two-step procedure. FIG. 2A illustrates the signature graph generated from a second hash block generated as the hash of the first block, i.e., from the hash block corresponding to the signature graph of FIG. 1A. FIG. 2B shows the signature graph for the hash of the "tuned" hash result from the previous example.

The signature graphs in FIGS. 2A and 2B are quite different, and easily distinguishable. Thus, if both the first and second signature graphs are presented to a user, the user can easily spot the difference. This means that an attacker is extremely unlikely to be able to generate a false input that produces a Thus, a signature graph generated from a mini blockchain, i.e., from at least two hash blocks where the first hash block is generated by using a data element to be shared as input to a hash function and where the second hash block is generated by using the first hash block as input to the same or a different hash function, can help a person easily identify whether a high-entropy value (such as a public key consisting of thousands of bits) is genuine, despite that the person cannot remember the high-entropy value itself. This means that the signature graph can be used to authenticate a public key for use in asymmetric cryptography applications, for example, without using a CA to endorse the public key. This important characteristic can have many cryptography applications.

Several examples are given below to show how the signature graph method can be used as a generic authentication method in secure hotspot Wi-Fi access, secure large-scale public Wi-Fi networks, secure casual Wi-Fi Direct/Aware connections, secure pairing/provisioning of Internet-of-Things (IoT) devices with no display and keypad, and secure catalog services enabling transport-layer security (TLS) without CA-issued security certificates. Particularly, the signature graph-based method can be used to unify several difficult Wi-Fi authentication/encryption scenarios (public hotspot Wi-Fi access, large-scale public Wi-Fi network, Wi-Fi Direct, Wi-Fi Aware, etc.) into one case, and secure them using the existing Wi-Fi standard protocol EAP-TLS.

Application to Secure Hotspot Wi-Fi Access

Internet access at Wi-Fi hot spots is typically either open (no encryption on the Wi-Fi link) or uses PSK (pre-shared key), based on a password posted in public sight at the hot spot. In either case, eavesdropping is very easy. Although there are more robust security methods, owners of these public APs (access points) seldom want to invest in more than basic free Wi-Fi access to attract customers to businesses that are not directly related to the presence of connectivity.

The Wi-Fi Alliance has developed an extension to the WPA3 standard, an enhanced open access method OWE (Opportunistic Wireless Encryption, IETF RFC 8110), that tries to solve this problem by employing encryption without authentication via a Diffie-Hellman key exchange algorithm. Because of the lack of authentication, this approach is vulnerable to different man-in-the-middle attacks, which are easy to carry out.

In a first type of man-in-the-middle attack, an attacker can setup its own AP impersonating a public AP and lure a naïve STA (station, a Wi-Fi device in IEEE 802.11 terminology) to connect to it. The attacker then relays the naïve STA's traffic to the real public AP, via the attacker's STA. The attacker's AP runs OWE with the naïve STA, while the attacker's STA runs OWE with the real public AP. Consequently, the naïve STA's data traffic over the air is encrypted, but remains decrypted in the link between the attacker's AP and the attacker's STA.

In a second type of man-in-the-middle attack, an attacker turns on a mobile hotspot function on his/her handset (truly providing Internet access), and configures his/her mobile hotspot's Service Set Identifier (SSID) using the public AP's SSID, thus luring some nearby user to connect to the attacker's mobile hotspot AP. Although the attacker's mobile hotspot AP runs OWE with the nearby user's STA, the attacker can easily snoop the user's data traffic while forwarding it to and from the Internet.

A signature graph-based solution to these vulnerabilities can be implemented as below:

During initialization, the AP generates a pair of public/private keys and saves them in non-volatile memory. The AP indicates that it supports EAP-TLS without STA-to-AP authentication and adds an information element (IE) in its beacon frame and probe response frame for broadcasting its self-signed certificate. By self-signed certificate is meant that the AP's certificate, which carries the public key used for public/private key transactions with the AP, is signed by the private key corresponding to the AP's own public key.

The owner of the public AP runs a tool on a Wi-Fi capable computer to detect the public AP's SSID and public key and generate the signature graph from these data elements. The owner prints the resulting signature graph, and posts it, along with the SSID, on site. The posting of the resulting signature graph may be by a visual display, e.g., on an LCD screen visible from the owner's facility by its customers.

A visiting STA scans for nearby APs. Once it detects an AP supporting EAP-TLS with a security certificate, it generates the signature graph from AP's public key and displays it, for the visitor to check whether the signature graph matches the posted version. After the visitor confirms the signature graphs match and chooses to connect to the AP, the STA and the AP can go with existing EAP-TLS protocol to create an encrypted link after a successful AP-to-STA authentication.

Figure 3:
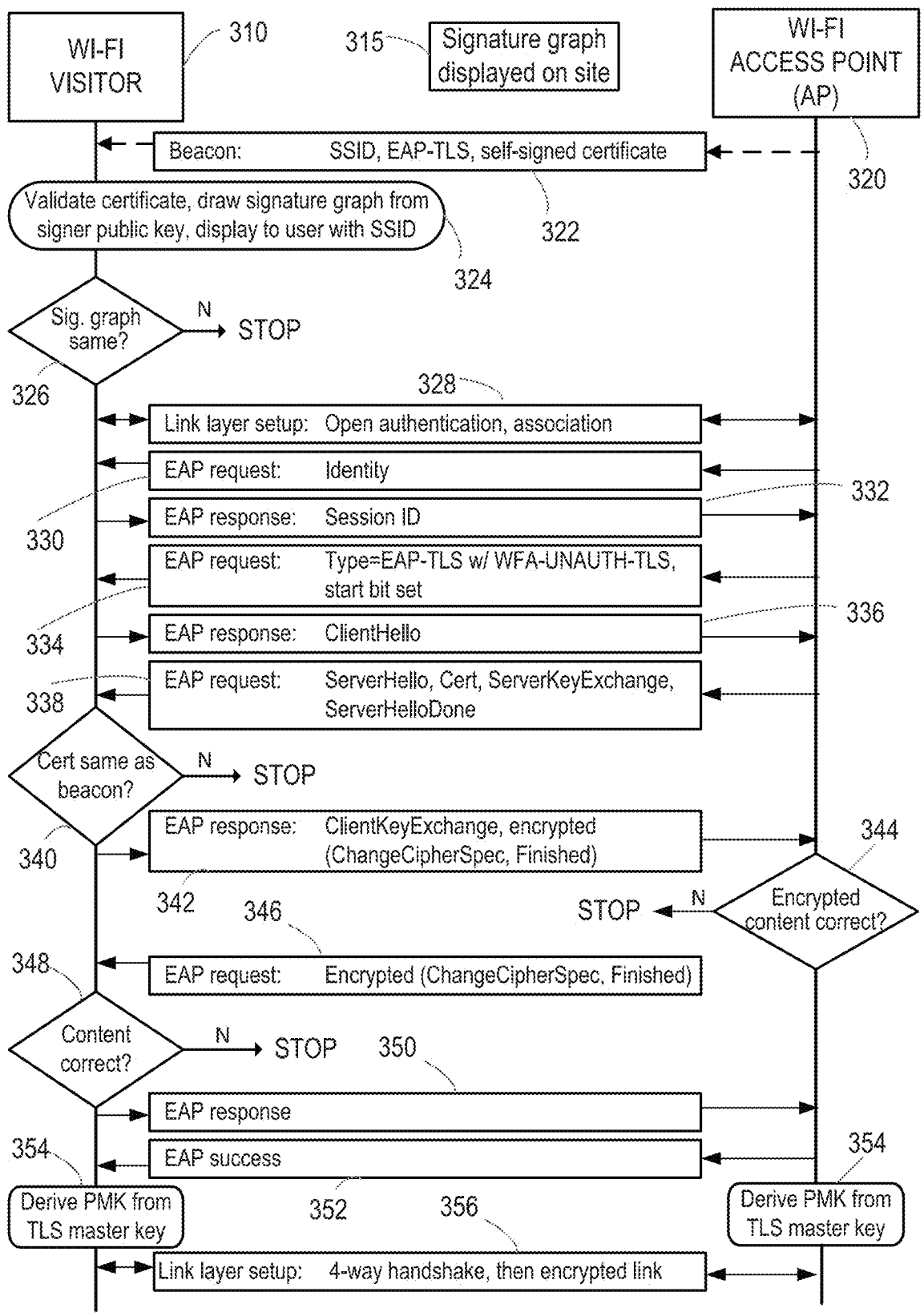
FIG. 3 shows protocol details for an example implementation of a signature graph-based approach to authentication.

FIG. 3 illustrates protocol details for an example implementation of this approach. The flow on the left-hand side of the figure corresponds to the technique outlined above, from the perspective of the user and STA connecting to the public network, illustrated in FIG. 3 as Wi-Fi visitor 310. The steps illustrated in the center of the figure are standard protocol steps for the Extensible Authentication Protocol (EAP). The flow on the right-hand side of the figure corresponds to the above technique, from the perspective of the AP and AP owner, illustrated in the figure as Wi-Fi AP 320.

The illustrated procedure begins with the transmitting of a beacon by Wi-Fi AP 320, as shown at step 322. This beacon includes the SSID of the AP, an indication of support for EAP-TLS protocol, and a certificate, signed by the Wi-Fi AP 320.

As shown at block 324, the Wi-Fi visitor 310 validates the certificate, using the Wi-Fi AP's public key, generates a signature graph from the signer's public key, using the techniques described herein, and displays it to the Wi-Fi STA's user. The user can then compare the displayed signature to a signature graph 315 displayed on site, by the owner of the Wi-Fi AP. If it matches, the procedure continues; otherwise, the procedure is stopped, as shown at block 326.

Steps 328, 330, 332, 334, 336, and 338 are conventional link establishment and EAP setup steps, as defined in the Internet Engineering Task Force (IETF) standard RFC 5216, for setting up a secure link between the Wi-Fi visitor 310 and Wi-Fi AP 320. As part of this process, an EAP request 338 sent from the Wi-Fi AP 320 to the Wi-Fi visitor 310 includes a certificate for the Wi-Fi AP. As shown at block 340, the Wi-Fi visitor 310 verifies that this is the same one as transmitted in the beacon 322—this verifies that the link establishment is being carried out with the same Wi-Fi AP that transmitted the beacon, and thus the Wi-Fi AP corresponding to the displayed signature graph 315.

Steps 342, 344, 347, 348, 350, 352, and 354 are again conventional steps, according to the EAP protocol, for establishing and verifying shared encryption keys. Once the Pairwise Master Key (PMK) has been derived by both the Wi-Fi visitor 310 and the Wi-Fi AP 320, as shown at block 354 on each side of the signal flow, a conventional link layer setup, including a 4-way handshake, can be performed, as shown at block 356, resulting in an encrypted link between the Wi-Fi visitor 310 and Wi-Fi AP 320.

Application to Secure Large-Scale Public Wi-Fi Network Access

Currently, large-scale public Wi-Fi networks are typically open in the link layer, enforce access control using a Web server, and leave data encryption to a high-layer solution such as a Virtual Private Network (VPN). The Web server does not necessarily always enforce access control; sometimes it merely requires a user to acknowledge service agreement. Users who do not use a VPN may risk having their data exposed to anyone nearby.

The signature graph-based solution can be implemented in a similar manner to that described above for secure hotspot Wi-Fi access. One difference is that the AP's certificate may need to be signed by the network operator's key. The signature graph-based solution can be implemented as below:

During initialization, each AP generates a pair of public/ private keys and saves them in non-volatile memory, then contacts a server to get its public key signed by the private key of the large-scale public Wi-Fi operator. (Alternatively, all APs in the network can use the same pair of public/private keys as long as each AP has good non-invasive physical security protection).

Each AP indicates it supports EAP-TLS without STA-to-AP authentication and adds an IE in its beacon frame and probe response frame for broadcasting its operator-signed certificate. In this case, then, the AP's certificate, which carries the public key used for public/private key transactions with the AP, is signed by the private key corresponding to the network operator's public key. Consequently, it is the operator's public key that needs to be authenticated by the end user.

The operator posts (or otherwise displays) the signature graph generated from the operator's public key next to every AP, along with SSID. (Alternatively, the operator might run advertisements to help users remember what its signature graph looks like, or print the signature graph in a menu, for example.)

A visiting STA scans for nearby APs. Once it detects an AP supporting EAP-TLS with a security certificate, it generates the signature graph from the public key of the AP's security certificate signer (the operator) and displays it, for the visitor to check whether the signature graph matches the posted version (or the signature graph learned from the operator's advertisement). After the visitor confirms the signature graphs match and chooses to connect to the AP, the STA and the AP can go with existing EAP-TLS protocol to create an encrypted link after a successful AP-to-STA authentication.

The operator can still use a Web server for access control.

The above shows that the signature graph method enables creation of security certificates without signatures from a CA, provided that the rough shape of the signer's signature graph is widely recognized and/or memorized. The signer may try different salt numbers with its public key in generating signature graphs, until a widely recognized or easy-to-memorize signature graph is obtained.

Figure 4:
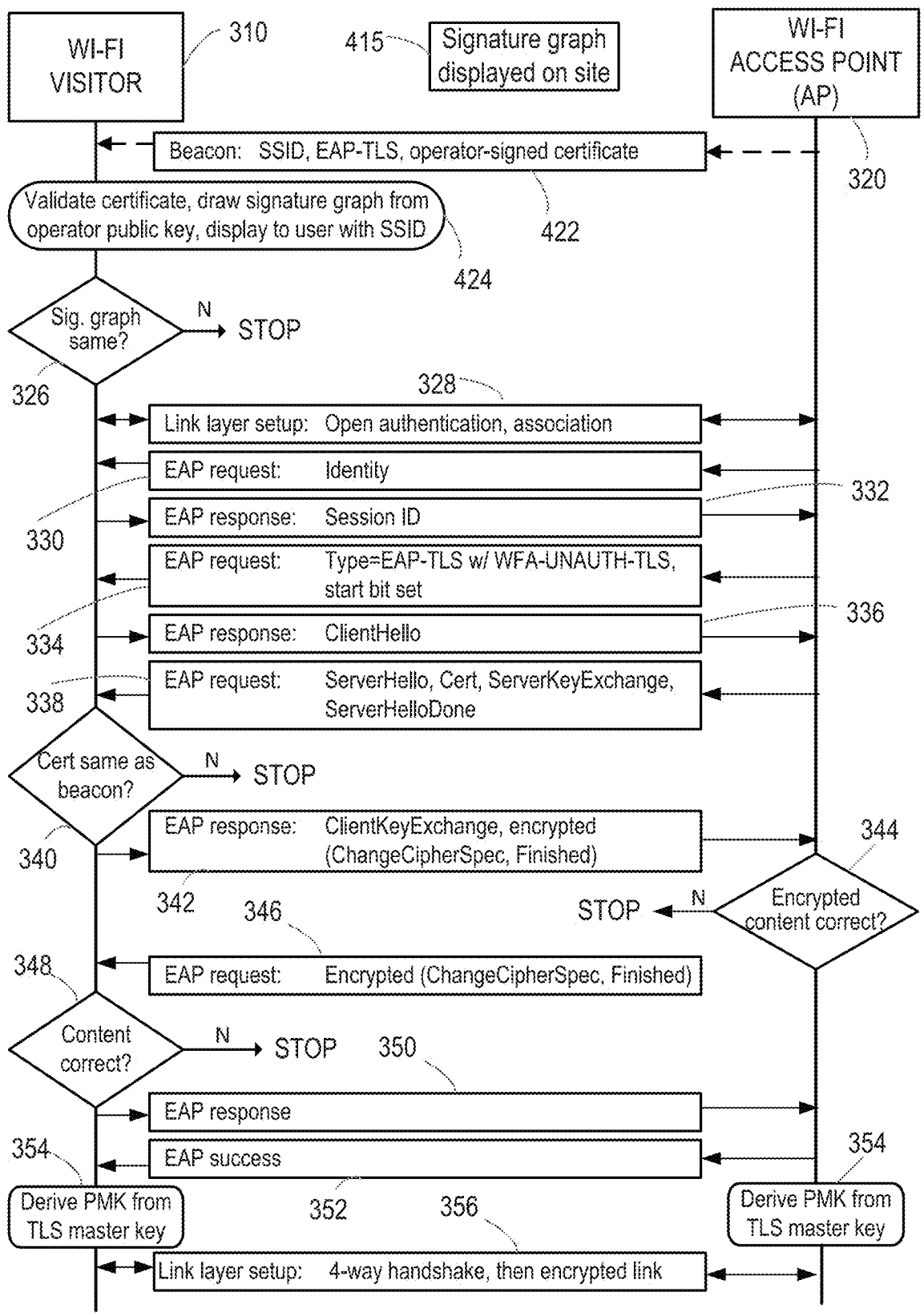
FIG. 4 illustrates protocol details for an example implementation of signature graph-based authentication using a network operator-signed certificate.

Example implementation protocol details of the technique described above for securing public Wi-Fi access with network operator-signed certificates are shown in FIG. 4. With only a few exceptions, the steps are the same as those shown in FIG. 3. However, in the procedure shown in FIG. 4, the signature graph 415 displayed on site is generated from an operator certificate, i.e., a certificate that is not necessarily unique to Wi-Fi AP 320. Consequently, the beacon 422 transmitted by the Wi-AP 320 carries the operator-signed certificate, rather than a certificate self-signed by the Wi-Fi AP. The verification performed by the Wi-Fi visitor 310, shown at block 424 in the figure, is performed using this operator-signed certificate, and the operator's public key. The rest of the procedure follows the same steps shown in FIG. 3.

Application to Secure Casual Wi-Fi Direct/Aware Connection

Users often have a need to create a secure casual Wi-Fi connection to exchange data on their devices (mobile phone, tablet, laptop, etc.). Before Wi-Fi Direct/Aware technology was available, users had to reply on an AP. An AP is not always available, of course, and demands a more complicated security setup.

Wi-Fi Direct/Aware technology has difficulties ensuring security for such casual connections at link layer. Wi-Fi Direct proposed a WPS-PIN method for authenticating two pairing Wi-Fi devices. But the PIN has only eight digits, because of the limitations of human memory. As a result, the weak PIN leads to the weak security performance of WPS-PIN method. Furthermore, after its development and deployment, the WPS-PIN method was totally compromised. Per the lesson from Wi-Fi Direct, Wi-Fi Aware specification simply leaves security problems to application-level protocols, as do some proprietary peer-to-peer Wi-Fi protocols. While certificate-based authentication in a proprietary peer-to-peer scheme may be robust, it typically requires the certificates to be signed by the device manufacturer or an affiliated party, so the protocol can be limited to use between devices that are made by the same device manufacturer.

All of these techniques for peer-to-peer communications can be improved using the signature graph-based techniques described herein. An example implementation is as follows:

Party A enables a Wi-Fi Direct/Aware service on his device. The device starts broadcasting a beacon containing the device's self-signed certificate, a specific SSID, and other IEs for the type of Wi-Fi Direct/Aware service, such as a photo exchange. It also indicates the device supports EAP-TLS. The device also displays a signature graph generated from its public key.

Party B's device scans and finds Party A's device's SSID and self-signed certificate. It runs the graph generation algorithm and generates Party A's device's public key's signature graph and displays it to Party B.

Party B verifies the Party A's signature graph on Party A's device against the graph generated on his own device. If they match, Party B instructs his device to connect to the Party A's device using EAP-TLS (mutual authentication is required), i.e., Party B's device needs to send its own self-signed certificate to Party A's device in EAP-TLS.

After Party A's device receives Party B's self-signed certificate, Party A's device runs the graph generation algorithm and generates Party B's device's public key's signature graph, displays it to Party A, and inquires whether Party A allows Party B to connect and start Wi-Fi Direct/Aware service.

Party A verifies the Party B's signature graph on Party B's device against the graph on his own device. If they match, Party A will allow the connection, then Party A's device will proceed to finish EAP-TLS and then the Wi-Fi standard-based 4-way handshake protocol for encrypted Wi-Fi communications between both devices.

Figure 5:
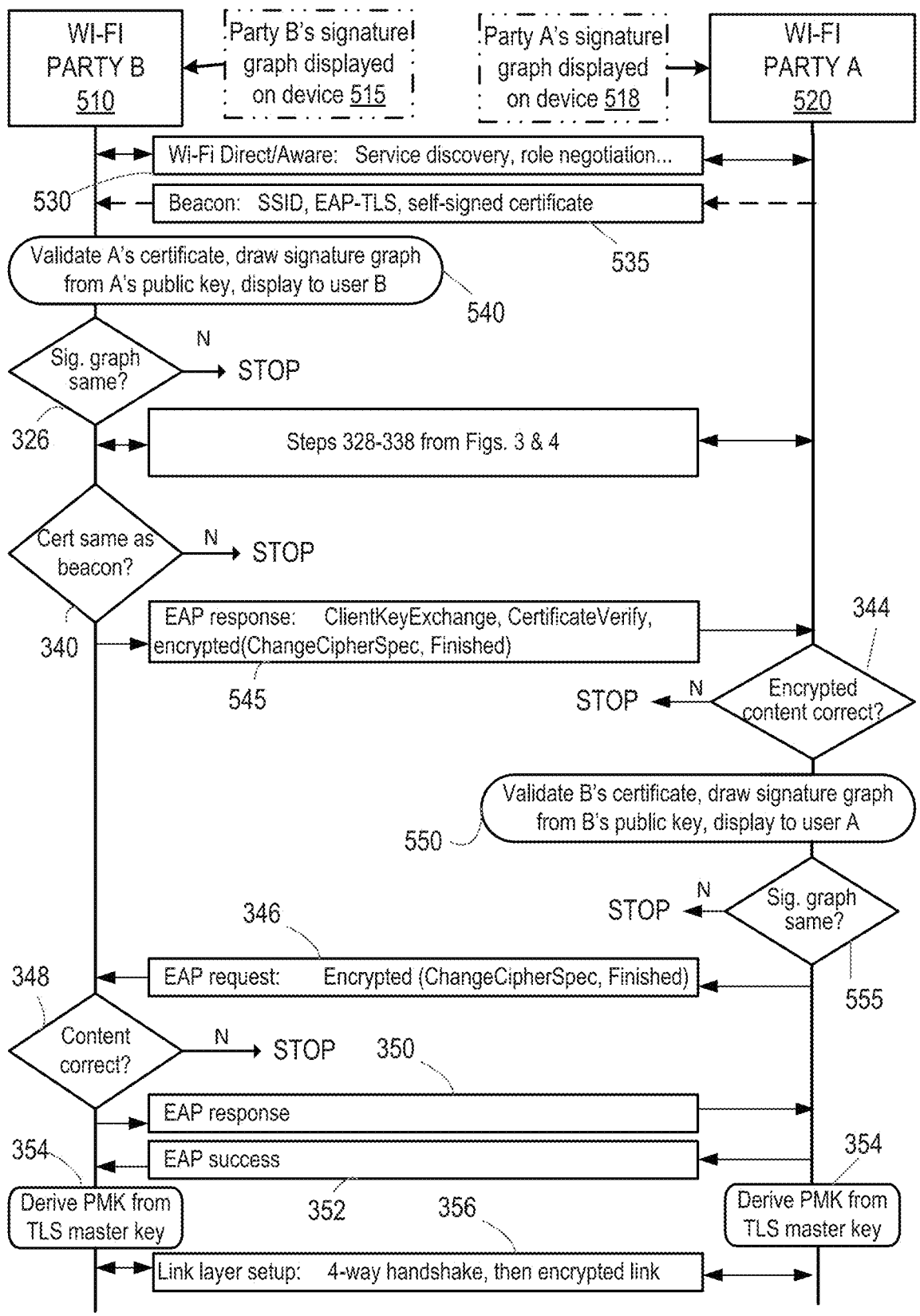
FIG. 5 shows protocol steps for an example connection setup.

FIG. 5 illustrates protocol details of an example secure Wi-Fi Direct/Aware connection setup. Once again, many of the steps are the same as shown in FIG. 3 and described above. In the protocol scenario illustrated in FIG. 5, however, the endpoints are Wi-Fi party A 510 and Wi-Fi party B 520, who each have a self-signed certificate that needs to be validated by the other user, using the corresponding signature graph. Thus, the validation process occurs twice—once in each direction.

As shown at step 530, the process begins with service discovery and role negotiation, in accordance with the Wi-Fi Direct or Wi-Fi Aware protocols. As shown at block 535, one of the users, in this case Wi-Fi Party A 520, transmits a beacon with an identifier for the device used by Wi-Fi Party A 520, an indication of support for EAP-TLS, and a self-signed certificate, i.e., a certificate signed by the device used by Wi-Fi Party A 520.

As shown at block 540, Wi-Fi Party B 510 receives the beacon, validates the certificate against the public key for Wi-Fi Party A 520's device, and generates a signature graph from the public key, displaying this signature graph to the user of the Wi-Fi Party B 510 device. User A can compare the signature graph displayed on his or her own device to the signature graph 518 displayed on Wi-Fi Party A's device, to ensure that the beacon and certificate were received from the proper device. If these match, as shown at block 326, then the EAP-TLS steps 38-344 are carried out, just as in FIGS. 3 and 4.

In the procedure shown in FIG. 5, however, the authentication is carried out in both directions. Thus, as shown at block 545, an EAP response message sent from Wi-Fi Party B 510 to Wi-Fi Party A 520 carries a certificate for Wi-Fi Party B, to be verified by Wi-Fi Party A. As shown at block 550, Wi-Fi Party A 520 validates this certificate and generates a signature graph from the public key used to sign the certificate from Wi-Fi Party B, displaying it to user A. User A can now compare the signature graph displayed on his or her own device to a signature graph 515 displayed on the device for Wi-Fi Party B 510. If the same, then the EAP-TLS procedure continues, culminating in an encrypted peer-to-peer link between the two devices.

Application to Secure Pairing/Provisioning with UI-Less IoT Devices

The term "UI-less IoT devices" refers to devices with Wi-Fi, Bluetooth (BT), Bluetooth Low Energy (BLE), or other radio interfaces, but without a full user interface (UI), i.e., without a display and keyboard. Examples are BLE earbuds, Wi-Fi bulbs, etc. The lack of a display or keyboard makes provisioning security difficult for these devices.

BT/BLE secure pairing protocol suffers man-in-the-middle attack on such devices because only "Just Works" mode can be used. Just Works mode runs a key exchange algorithm without authentication because a shared secret or a public key cannot be easily provisioned into such devices.

WFA tries to solve this problem with UI-less Wi-Fi devices by using DPP (Device Provisioning Protocol). A user can use his smartphone to scan a QR code printed on the device or the device packaging, which is the device's public key. Then the user can easily configure the Wi-Fi device by sending the security settings encrypted using the device's public key. However, the device-specific QR code yields higher production cost, and cannot prevent an attacker from printing his own public key in a QR code on the device or device packaging, in which case the attacker can decrypt the security settings and create an even worse security situation for the owner.

A signature graph-based secure pairing/provisioning with UI-less IoT devices can be implemented as follows:
The device manufacturer tries various salt numbers with its root public key in generating signature graphs, until a meaningful signature graph is obtained. The manufacturer prints this signature graph on every device (identical print yields lower production cost). Alternatively, the manufacturer can use a non-meaningful signature graph, and print its URL on the device, which will guide the user's browser to the manufacturer's web site, where the signature graph will be shown.
Before it is shipped to a retailer or end device, a public/private key pair is generated for each device and the device goes through a device attestation protocol with a factory server, obtaining a security certificate signed by the manufacturer's root public key.
When a user provisions the device, the user's handheld device, laptop computer, or the like picks up the device's security certificate from the wireless channel (e.g., a secondary advertisement channel for BLE 5.0+ device and Wi-Fi beacon for Wi-Fi devices), verifies the security certificate's signature, and displays the generated signature graph from the manufacturer's root public key (embedded in the security certificate) for the user to verify. If the generated signature graph matches the printed signature graph and the manufacturer's signature graph in user's memory or on the manufacturer's web site, the device can be trusted, and the device's public key can be trusted. The rest of the security settings can be provisioned easily.

Application to a Catalog Service Enabling TLS Without Certificate

The Transport Layer Security (TLS) protocol has been a foundation for almost all secure Internet connections. Many popular security protocols such as HTTPS, secure email, etc., are based on TLS. TLS requires the server have a security certificate issued by a well-known CA, with the CA's public key known as prior knowledge to the client. This requirement often puts some financial burden on small Internet hosts.

It is often the case that a security certificate is signed by a CA unknown to the user's client utility program, and the client utility program must ask the user whether to proceed by blindly trusting the CA's public key. The user often chooses to proceed, bearing significant security risk, because otherwise the user has no way to verify the CA's public key.

A signature graph can be used to solve the above problem in the following way:
A trusted catalog service can be run on the Web, displaying an Internet host's address (URL, email address, etc.) with its public key and generated signature graph. The catalog content can be signed, and the catalog server can have a security certificate issued by a well-known CA.
An Internet host without a security certificate issued by a well-known CA can generated a security certificate with the catalog server's URL included, signed by its own public key.
When a client utility program sets up a TLS connection with the Internet host, it will find it does not know the CA's public key in the security certificate presented by the Internet host. It will display the security certificate's content, including the catalog's URL, and ask the user to decide whether to proceed by blindly trusting the CA's public key (in this case, the Internet host's public key).
The user can browse the catalog to verify if the signature graph for the Internet host in the catalog matches the generated signature graph from the received CA's public key. If they match, the user can trust the CA's public key (i.e., the Internet host's public key) and allow the client utility program to proceed to create a TLS connection with the Internet host.
Alternatively, if the client utility program is improved to be capable of automatically extracting the Internet host's public key from the catalog, the above verification process can be automated.

The above signature graph-based verification method can be applied to existing client utility programs.

Figure 6:
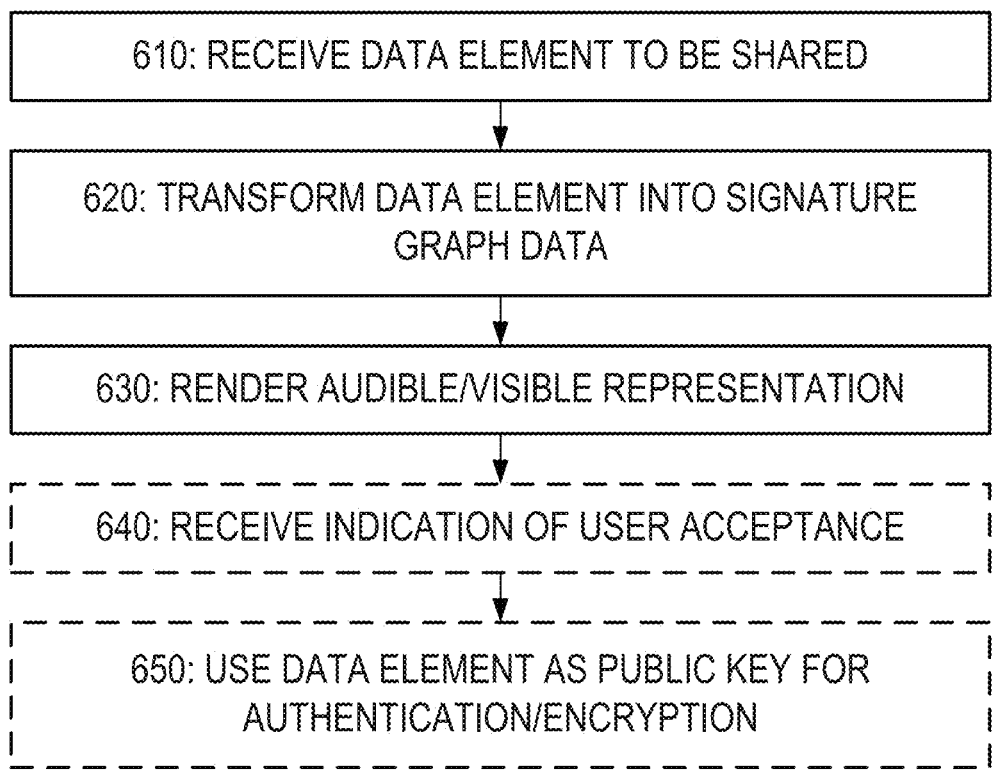
FIG. 6 is a process flow diagram illustrating an example method for authenticating a shared data element, using a signature-graph approach.

FIG. 6 illustrates a method for authenticating a shared data element according to the signature graph approach, from the perspective of a computing device authenticating, i.e., validating, a shared data element provided to it. This method is intended to reflect a generalization of parts of the techniques described above, and thus should be understood as encompassing many of the details provided above. Where the terminology used to describe the method of FIG. 6 differs somewhat from that used above, the former should be interpreted broadly, so as to at least encompass similar terms used above.

As shown at block 610, the method comprises receiving a data element to be shared. This data element could be a public key received in a certificate, for example, or a password. The computing device might receive the data element via a radio-frequency link, e.g., via Wi-Fi, Bluetooth, or the like, or via a wired connection, in various embodiments or instances.

As shown at block 620, the method further comprises transforming the data element to be shared into signature graph data, using at least one collision-resistant one-way mapping function. By "collision-resistant" is meant that no collision-resistant: no randomized polynomial-time algorithm can find a collision, i.e., two distinct values x, y such that the mapping function f(*) yields the same result, i.e., f(x)=f(y), with a non-negligible probability. By "one-way" is mean that the function f(*) can be computed by a polynomial-time algorithm but any polynomial-time randomized algorithm that attempts to create a pseudo-inverse for f(*) has a negligible probability of success. Examples of collision-resistant one-way mapping functions are hash functions, including the well-known SHA family of hash functions. Various encryption algorithms might also be used as collision-resistant one-way mapping functions.

As shown at block 630, the method still further comprises rendering a human-perceptible representation of the signature graph data, such as an audible and/or visual representation, for perception by a user of the computing device. This step might be based on the dot-based technique described above, for example.

In some embodiments or instances, the method may further comprise receiving, from the user of the computing device, an indication of acceptance of the shared data element. This is shown at block 640, and could be as simple as a button push, for example. The method in these embodiments or instances may further comprise, responsive to receiving this indication of acceptance, using the data element as a public key for authenticating and/or encrypting communications with a second device. This is shown at block 650.

The second device in these embodiments or instances might be a wireless AP to a communications network, for example, or another user's personal device. The method might further comprise displaying an identifier for the second wireless device, such as an SSID or network operator name, in association with rendering of an audible and/or visual representation of the signature graph data.

In various embodiments of the illustrated method, transforming the data element to be shared into signature graph data might comprise the steps of applying a cryptographic hash function to the data element to be shared, to obtain a first hash output, and then applying a cryptographic hash function to the first hash output, to obtain the signature graph data. The same or a different cryptographic hash function may be used in the second step. Additional similar "chaining" of hash operations may be used, in some embodiments or instances. In addition, transforming the data element to be shared into the signature graph data might comprise adding salt data to the input of either or both of the cryptograph hash steps.

In some embodiments or instances, rendering the signature graph data, as shown at block 630, may comprise rendering a visual representation of the signature graph data by dividing the signature graph data into a series of blocks, for rendering of each block comprising a plurality of bits, and rendering an image comprising a visual data object for each block. This visual data object may be a "dot" or "block," for example. Each visual data object in these embodiments or instances has at least two of the following characteristics determined from respective one or more bits of the corresponding block: a display color for the visual data object; a direction of offset for the visual data object from a reference point or line; and a distance offset for the visual data object from a reference point or line.

In some of these embodiments or instances, this rendering of the image may comprise mapping at least one bit of each block to one of multiple colors for the visual data object, mapping at least one bit of each block to one of multiple directions of offset for the visual data object, and mapping at least one bit of each block to a distance offset for the visual data object.

Figure 7:
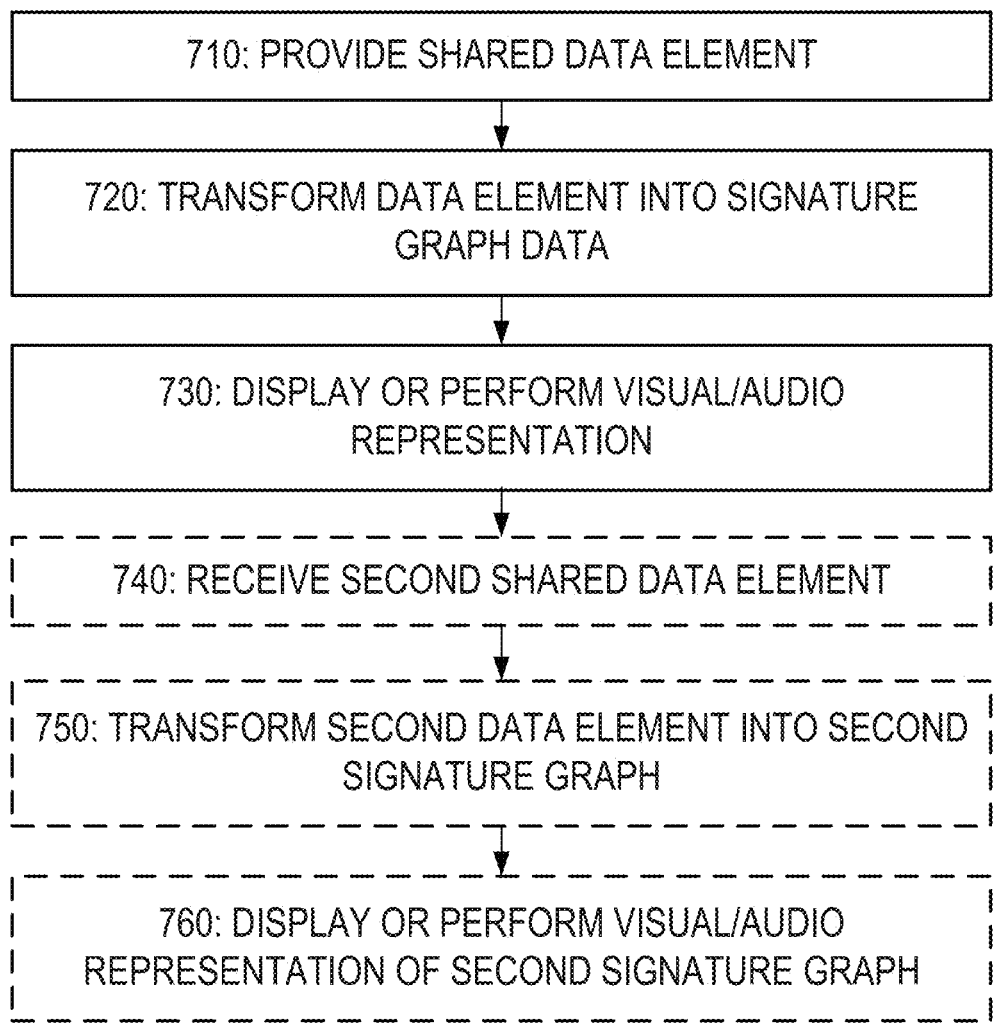
FIG. 7 is a process flow diagram showing a method for distributing a shared data element.

FIG. 7 illustrates a corresponding method for distributing a shared data element. This method complements the one shown in FIG. 6. Again, this should be understood as a generalized method encompassing several of the detailed example techniques described above, from the perspective of the "sender" of the public key or other shared data element.

As shown at block 710, the example method of FIG. 7 includes the step of providing, to a receiving device, the shared data element. Again, this data element could be a public key sent in a certificate, for example, or a password. The data element might be provided via a radio-frequency link, e.g., via Wi-Fi, Bluetooth, or the like, or via a wired connection, in various embodiments or instances.

The method further comprises the step of transforming the data element to be shared into signature graph data, using at least one collision-resistant one-way mapping function. This step is shown at block 720 and corresponds exactly to the step shown at block 620 of FIG. 6. Note that while block 720 is shown following block 710 in FIG. 7, the providing step of block 710 might be performed at any time before or after the transforming step of block 720, and might be performed many times, in some embodiments or instances.

As shown at block 730, the method still further comprises displaying or performing a visual and/or audio representation of the signature graph data, for perception by a user of the receiving device.

Note that this displaying or performing might be provided by the same computing device that performs the providing and transforming steps shown in FIG. 7, or by a different device or means, in various embodiments. For example, displaying a visual representation of the signature graph data might be performed by a television screen or a poster hung on the wall, or by printing the visual representation in a menu or flyer.

As was the case with the method shown in FIG. 6, the transforming step shown at block 720 of FIG. 7 may comprise, in some embodiments or instances, applying a cryptographic hash function to the data element to be shared, to obtain a first hash output, and applying a cryptographic hash function to the first hash output, to obtain the signature graph data. Again, the same or different cryptographic hash function may be used for the hashing of the first hash output. Further, transforming the shared data element into signature graph data may comprise adding salt data to the input of either or both of the applying steps.

In some embodiments, the displaying or performing shown at block 730 of FIG. 7 may comprise rendering a visual representation of the signature graph data, which in turn may comprise dividing the signature graph data into a series of blocks, for rendering of each block comprising a plurality of bits, and rendering an image comprising a visual data object for each block. Each visual data object may have at least two of the following characteristics determined from respective one or more bits of the corresponding block, in various embodiments or instances: a display color for the visual data object; a direction of offset for the visual data object from a reference point or line; and a distance offset for the visual data object from a reference point or line. In some of these embodiments or instances, the rendering may comprise mapping at least one bit of each block to one of multiple colors for the visual data object, mapping at least one bit of each block to one of multiple directions of offset for the visual data object, and mapping at least one bit of each block to a distance offset for the visual data object.

In some embodiments of instances of the method shown in FIG. 7, the shared data element is a public key for a wireless access point, in which case the step of providing the shared data element may comprise transmitting the public key, e.g., as part of a certificate, for reception by the receiving device. In some of these embodiments or instances, the method may further comprise displaying an identifier for the wireless access point, such as an SSID or operator name, in association with the displaying or performing of the visual and/or or audio representation of the signature graph data.

In other embodiments or instances, the providing, transforming, and displaying or performing steps are performed by a first user device and the receiving device is a second user device. Providing the shared data element may comprise transmitting the shared key from the second user device to the first user device, in some of these embodiments or instances. The method may further comprise, in some of these embodiments or instances, receiving a second shared data element, transforming the second data element to be shared into second signature graph data, using the at least one collision-resistant one-way mapping function, and rendering an audible and/or visual representation of the second signature graph data, for perception by a user of the first user device. These steps are shown in blocks 740, 750, and 760.

Figure 8:
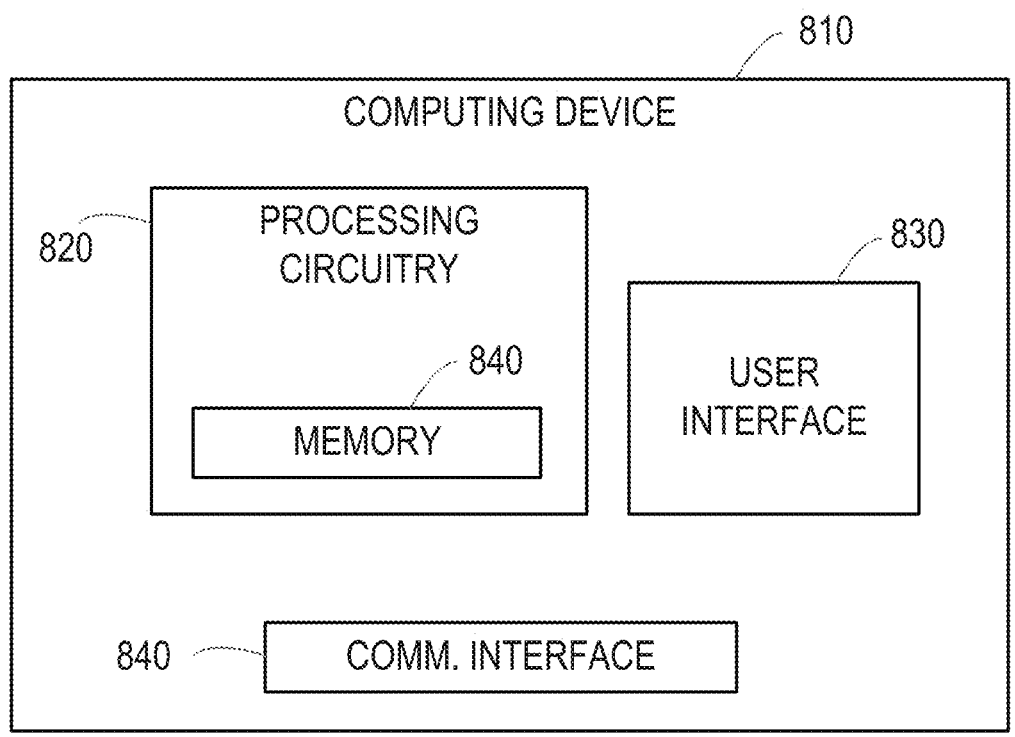
FIG. 8 is a block diagram of an example computing device.

FIG. 8 illustrates an example of a computing device 810 that may perform some or all of the techniques described above, in various embodiments. The example computing device 810 includes processing circuitry 820, which may in turn comprise one or more microprocessors, microcontrollers, digital signal processors, or the like, as well as memory 825. Computing device 810 further comprises a user interface 830 configured to display visual content and/or perform audio content. This user interface 830 may comprise one or more displays, speakers, microphones, and/or keyboards/keypads, for example. Computing device 810 still further comprises a communication interface 840 for communicating with one or more other devices. This communication interface might comprise radio circuitry and associated control circuitry for communicating via Wi-Fi, Bluetooth, and/or any other radio interface, for example, and may instead or also comprise an interface for wired communications, e.g., an Ethernet driver and connector interface.

The processing circuitry 820 is operatively coupled to the communication interface 830 and user interface 840, and in some embodiments may be configured, e.g., with program code stored in memory 825, to carry out a method like that described in FIG. 6 for example. In other words, the processing circuitry 820 may be configured to receive a data element to be shared, via the communication interface 840, transform the data element to be shared into signature graph data, using at least one collision-resistant one-way mapping function, and use the user interface 830 to render an audible and/or visual representation of the signature graph data, for perception by a user of the computing device 810. The processing circuitry 820 might be configured to carry out any of the variations of this method discussed above, in various embodiments.

In some of these and in other embodiments, computing device 810 might be configured to be the "sending" device of the shared data element. In these embodiments, the processing circuitry 820 might be configured to carry out a method like that shown in FIG. 7, for example, or any of the variations discussed above. Thus, processing circuitry 820 might be configured to provide a shared data element to a receiving device, transform the shared data element d into signature graph data, using at least one collision-resistant one-way mapping function, and display or perform a visual and/or audio representation of the signature graph data, for perception by a user of the receiving device.

As a generalization of the techniques described above, an animation, a video, a meaningful piece of audio, or any presentation form for human perception, can be generated as a signature, from the signature graph data. The characteristics of the hash function or other one-way function and the blockchain described above ensure that it is computationally impossible to generate a similar signature graph from a different piece of data. This means the signature graph can be used to authenticate a piece of difficult-to-memorize, high-entropy data, such as a public key, without using a CA to endorse the public key.

Several examples were provided above to show how the signature graph method can be used as a generic method in a variety of cryptography applications, such as secure hotspot Wi-Fi access, secure casual Wi-Fi Direct/Aware connection, secure pairing/provisioning with IoT devices with no display and keypad, secure large-scale public Wi-Fi network access, etc. These are specific example where the signature graph techniques can be used to improve security while avoiding the need for expensive or complicated infrastructure. The techniques described herein are not limited to those specific applications but may be applied to other scenarios where there is a need to authenticate or validate shared data.

What is claimed is:
1. A method, in a computing device, for authenticating a shared data element, the method comprising:
receiving a data element to be shared;
transforming the data element to be shared into signature graph data, using at least one collision-resistant one-way mapping function, wherein transforming the data element comprises:
applying a cryptographic hash function to the data element to be shared, to obtain a first hash output, and
applying a cryptographic hash function to the first hash output, to obtain the signature graph data;

rendering a human-perceptible representation of the signature graph data, using a user interface of the computing device, for perception by a user of the computing device;
receiving, from the user of the computing device, an indication of acceptance of the shared data element; and,
responsive to receiving said indication of acceptance, authenticating communications with a second device using the data element as a public key.

2. The method of claim 1, wherein the second device is a wireless access point to a communications network.

3. The method of claim 1, wherein the method further comprises displaying an identifier for the second device, in association with rendering a representation of the signature graph data.

4. The method of claim 3, wherein the identifier comprises an SSID and a network operator name.

5. The method of claim 1, wherein the same cryptographic hash function is used in both applying steps.

6. The method of claim 1, wherein transforming the data element to be shared into signature graph data comprises adding salt data to the input of either or both of the applying steps.

7. The method of claim 1, wherein said rendering comprises rendering a visual representation of the signature graph data by:
dividing the signature graph data into a series of blocks, for rendering of each block comprising a plurality of bits;
rendering an image comprising a visual data object for each block, each visual data object having at least two of the following characteristics determined from respective one or more bits of the corresponding block:
a display color for the visual data object;
a direction of offset for the visual data object from a reference point or line; and
a distance offset for the visual data object from a reference point or line.

8. The method of claim 7, wherein rendering the image comprises:
mapping at least one bit of each block to one of multiple colors for the visual data object;
mapping at least one bit of each block to one of multiple directions of offset for the visual data object; and
mapping at least one bit of each block to a distance offset for the visual data object.

9. A method for distributing a shared data element, the method comprising:
providing, to a receiving device, the shared data element;
transforming the data element to be shared into signature graph data, using at least one collision-resistant one-way mapping function, wherein transforming the shared data element into signature graph data comprises:
applying a cryptographic hash function to the shared data element, to obtain a first hash output; and
applying a cryptographic hash function to the first hash output, to obtain the signature graph data; and
expressing a representation of the signature graph data, using a user interface of the receiving device, for perception by a user of the receiving device;
receiving, from the receiving device, an indication of acceptance of the shared data element; and,
responsive to receiving said indication of acceptance, authenticating communications with the receiving device using the data element as a public key.

10. The method of claim 9, wherein the same cryptographic hash function is used in both applying steps.

11. The method of claim 9, wherein transforming the shared data element into signature graph data comprises adding salt data to the input of either or both of the applying steps.

12. The method of claim 9, wherein said displaying or performing comprises rendering a visual representation of the signature graph data by:
dividing the signature graph data into a series of blocks, for rendering of each block comprising a plurality of bits;
rendering an image comprising a visual data object for each block, each visual data object having at least two of the following characteristics determined from respective one or more bits of the corresponding block:
a display color for the visual data object;
a direction of offset for the visual data object from a reference point or line; and
a distance offset for the visual data object from a reference point or line.

13. The method of claim 12, wherein rendering the image comprises:
mapping at least one bit of each block to one of multiple colors for the visual data object;
mapping at least one bit of each block to one of multiple directions of offset for the visual data object; and
mapping at least one bit of each block to a distance offset for the visual data object.

14. The method of claim 9, wherein the shared data element is a public key for a wireless access point and wherein providing the shared data element comprises transmitting the public key for reception by the receiving device.

15. The method of claim 14, wherein the method further comprises displaying an identifier for the wireless access point, in association with the displaying or performing of the representation of the signature graph data.

16. The method of claim 15, wherein the identifier comprises an SSID and a network operator name.

17. The method of claim 9, wherein the providing, transforming, and displaying or performing steps are performed by a first user device and wherein the receiving device is a second user device, wherein providing the shared data element comprises transmitting the shared key from the second user device to the first user device.

18. The method of claim 17, wherein the method further comprises:
receiving, from the second user device, a second data element to be shared;
transforming the second data element to be shared into second signature graph data, using the at least one collision-resistant one-way mapping function; and
rendering an audible and/or visual representation of the second signature graph data, for perception by a user of the first user device.

19. A computing device, comprising:
a communication interface for communicating with one or more other devices;
a user interface for expressing human-perceptible content; and
processing circuitry operatively coupled to the communication interface and user interface,
wherein the processing circuitry is configured to:
receive a data element to be shared, via the communication interface;
transform the data element to be shared into signature graph data, using at least one collision-resistant one-way mapping function, wherein transforming the data element comprises:
  applying a cryptographic hash function to the data element to be shared, to obtain a first hash output, and
  applying a cryptographic hash function to the first hash output, to obtain the signature graph data;
use the user interface to render a human-perceptible representation of the signature graph data, for perception by a user of the computing device
receive, from the user of the computing device, an indication of acceptance of the shared data element; and,
responsive to receiving said indication of acceptance, authenticating communications with a second device using the data element as a public key.

20. A computing device, comprising:
a communication interface for communicating with one or more other devices;
a user interface for expressing human-perceptible content; and
processing circuitry operatively coupled to the communication interface and the user interface,
wherein the processing circuitry is configured to:
provide, to a receiving device, the shared data element;
transform the shared data element into signature graph data, using at least one collision-resistant one-way mapping function, wherein transforming the shared data element comprises:
  applying a cryptographic hash function to the data element to be shared, to obtain a first hash output, and
  applying a cryptographic hash function to the first hash output, to obtain the signature graph data;
display or perform a human-perceptible representation of the signature graph data, using the user interface of the computing device, for perception by a user of the receiving device
receive, from the user of the receiving device, an indication of acceptance of the shared data element; and,
responsive to receiving said indication of acceptance, authenticating communications with a receiving device using the data element as a public key.

* * * * *